United States Patent [19]

Gorgone et al.

[11] Patent Number: 4,563,771

[45] Date of Patent: Jan. 7, 1986

[54] AUDIBLE SECURITY VALIDATOR

[75] Inventors: Robert L. Gorgone, Mentor; Anthony H. Dolejs, Bedford Heights, both of Ohio

[73] Assignee: Ardac, Inc., Eastlake, Ohio

[21] Appl. No.: 539,082

[22] Filed: Oct. 5, 1983

[51] Int. Cl.[4] .................. G06K 9/00

[52] U.S. Cl. .................. 382/7; 194/4 R; 209/534; 381/52; 382/65; 434/116

[58] Field of Search .................. 382/7, 64, 65, 62, 57; 235/476, 474, 480, 475, 477; 340/825.3, 825.34, 835.35; 356/71; 194/4 R; 209/534; 267/70, 169, 154, 155, 170, 173; 434/116; 381/51-53; 250/556

[56] References Cited

U.S. PATENT DOCUMENTS

| | | | |
|---|---|---|---|
| 218,309 | 8/1879 | Palmatier | 267/70 |
| 892,430 | 7/1908 | Jenkins | 267/173 |
| 1,194,336 | 8/1916 | Keim | 267/170 |
| 1,508,081 | 11/1923 | Bean | 267/155 |
| 1,925,945 | 9/1933 | Zielinski et al. | 267/155 |
| 2,452,208 | 10/1948 | Reger | 267/173 |
| 3,199,080 | 8/1965 | Rabinow et al. | 382/57 |
| 3,264,610 | 8/1966 | Rabinow | 382/57 |
| 3,874,097 | 4/1975 | Mauch et al. | 434/116 |
| 3,906,449 | 9/1975 | Marchak | 340/825.34 |
| 3,949,363 | 4/1976 | Holm | 382/64 |
| 4,179,685 | 12/1979 | O'Maley | 382/7 |
| 4,231,014 | 8/1980 | Ponzio | 382/7 |
| 4,259,569 | 3/1981 | Passer et al. | 235/476 |
| 4,283,708 | 8/1981 | Lee | 382/7 |
| 4,454,608 | 6/1984 | Maeba | 381/51 |
| 4,464,786 | 8/1984 | Nishito et al. | 382/7 |
| 4,464,787 | 8/1984 | Fish et al. | 382/7 |
| 4,509,129 | 4/1985 | Yatsunami et al. | 381/51 |

*Primary Examiner*—Leo H. Boudreau
*Assistant Examiner*—Joseph Mancuso
*Attorney, Agent, or Firm*—Oldham, Oldham & Weber Co.

[57] ABSTRACT

A security validator particularly adapted for use by the blind. The validator includes sensors testing both top and bottom portions of a note to determine its authenticity and its denomination. Upon completion of the sensing operation, a voice recording or other audible indicia is emitted, indicating both the denomination and validity of the note. The invention also includes various devices for urging the note toward the sensor to assure high resolution data gathering. Additionally, testing of the note begins on the "green edge" of the note to assure that data is gathered from proper positions along the note.

3 Claims, 15 Drawing Figures

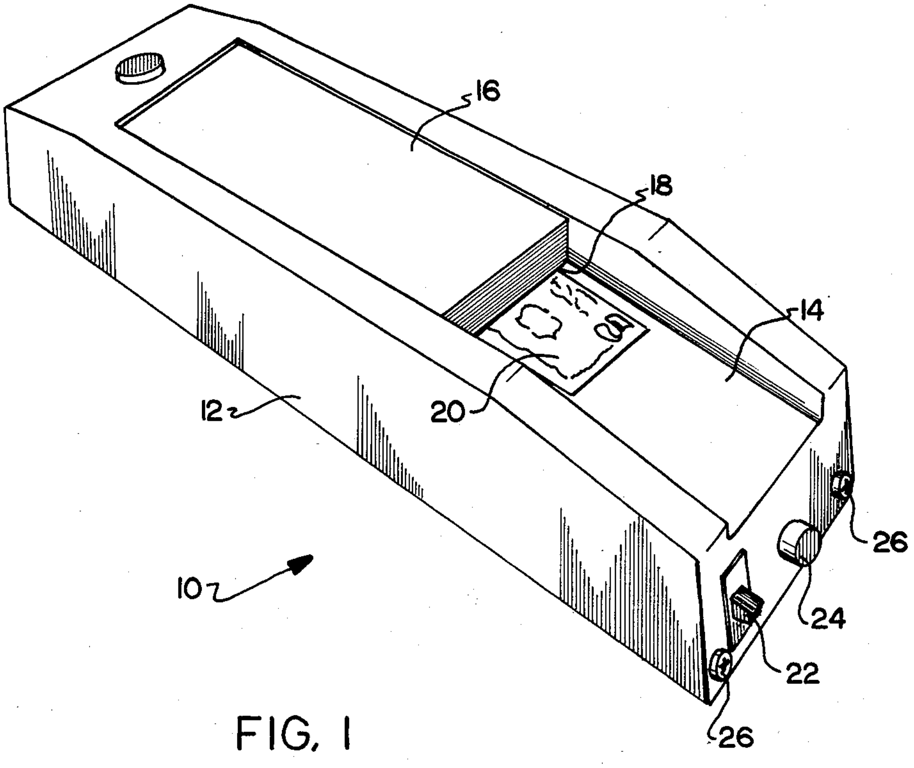
FIG. 1
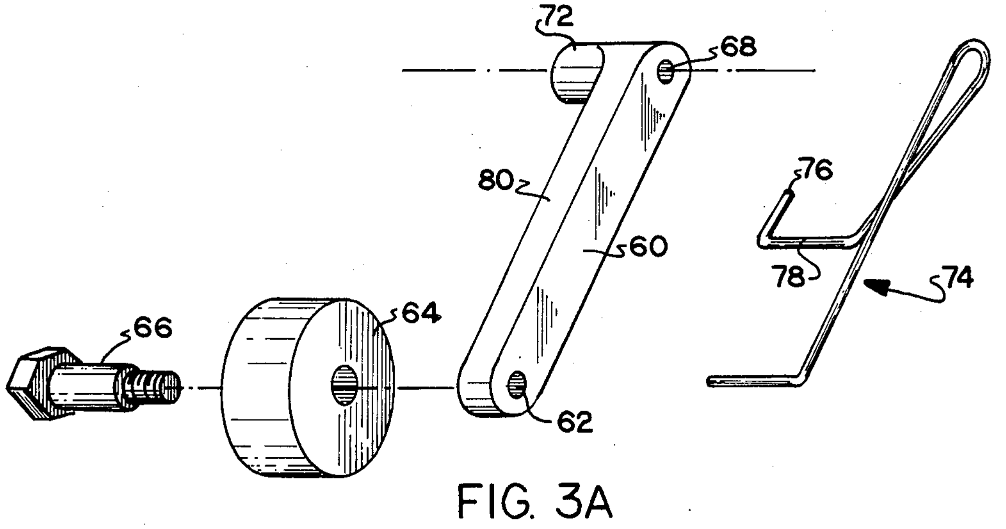
FIG. 3A
FIG. 3

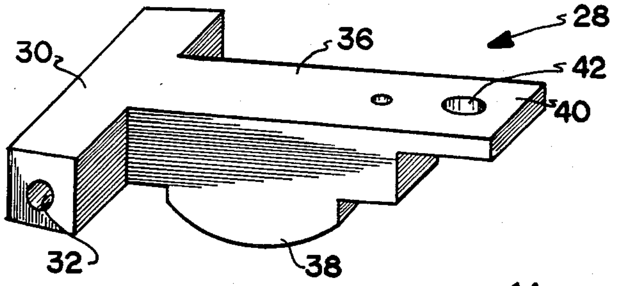
FIG. 2A
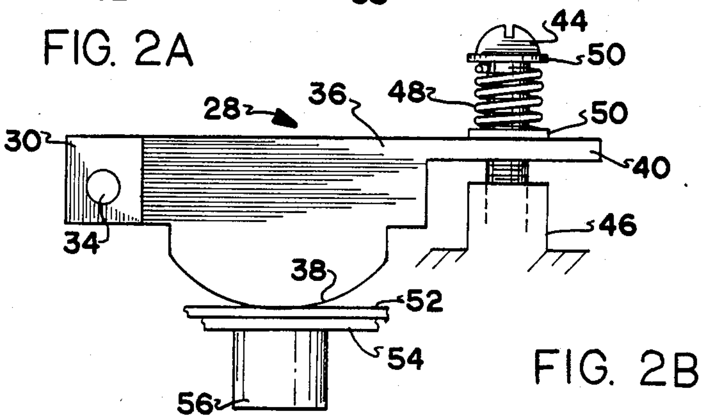
FIG. 2B
FIG. 2
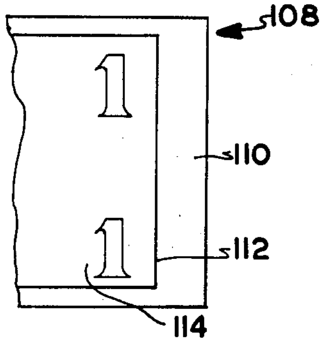
FIG. 5A
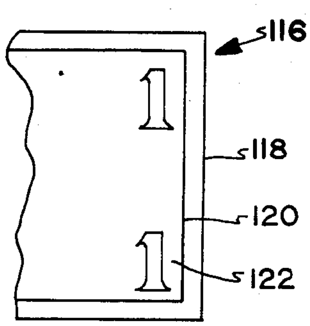
FIG. 5B
FIG. 5

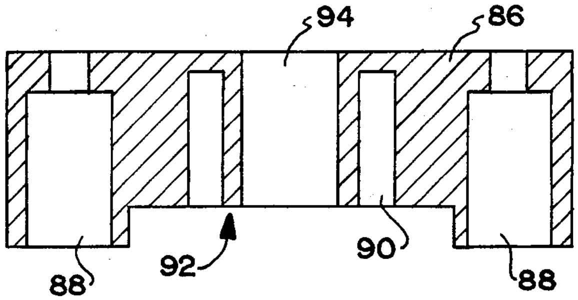
FIG. 4A
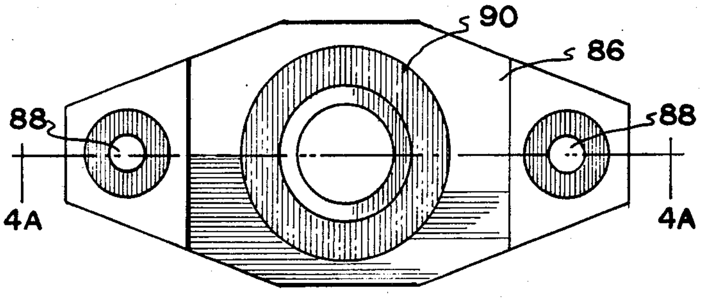
FIG. 4B
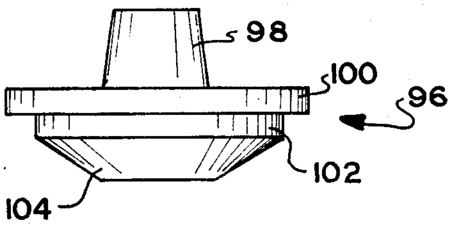
FIG. 4C
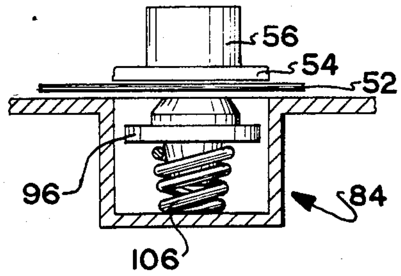
FIG. 4D
FIG. 4
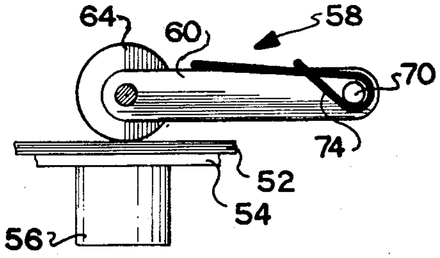
FIG. 3B

AUDIBLE SECURITY VALIDATOR

TECHNICAL FIELD

The invention herein resides in the art of security validators and improvements therein. More particularly, the invention consists of a small table top validator adapted for use by the blind to assist them in determining the authenticity and denomination of a piece of paper tendered as valid currency.

BACKGROUND ART

Security validators have been known for many years. Typically, such validators are used for the vending of change and/or goods in return for a piece of paper currency. The state of the art of security validators is best shown in U.S. Pat. No. 4,348,656, to ARDAC, INC., of Willoughby, Ohio, the assignee of the instant application. The invention of that patent teaches the use of a microprocessor to implement various tests performed along the note as the same traverses a note path. The microprocessor then determines the authenticity of the paper tendered as a piece of valid currency as a function of data taken along the note path.

Various types of sensors have also become known in the security validator art. Both reflectance and transmissive types of sensors have been used. The instant invention contemplates the utilization of an LED reflectance sensor such as is well known in the art and, accordingly, the specific type of sensor is not presented as being novel apart from the invention as a whole.

Blind people are at a specific disadvantage in handling currency, as compared to coinage. While a learned blind person may readily determine the validity and value of a piece of coinage from its size and weight, such a determination cannot be made as to currency. While the blind may determine from the texture of a piece of paper that it is, indeed, currency, they are still at a loss to determine the denomination of such currency. As is well known, many public buildings have coffee shops or vending stations operated by the blind. With such blind people being at a disadvantage, or at the mercy of the public, in determining the denomination of a piece of currency, there is a need for a security validator capable of communicating with the blind to advise them as to both the validity and denomination of currencies. Such a device would, of necessity, be of small physical size, easy to store and handle, and include means for audibly communicating the necessary information. Further, such a device would need to recognize a plurality of denominations of currency, regardless of the attitude or position at which they are tendered to the device. In other words, the device would need to have the capability of testing a paper bill presented in either one of four postures: face up, face down, forward, or backward.

A security validator for use by the blind would preferably be of a simplistic nature, while being reliable in its sensing and data processing operations. Specifically, the device would need to be able to determine, for example, the difference between a one dollar bill and a five dollar bill, or a twenty dollar bill, it being understood that the blind can often distinguish by texture whether a piece of paper is indeed a piece of currency. To provide such a simplistic security validator, it is necessary that means be provided for assuring a close positional relationship between the currency and the sensor and that further means be provided to assure that the taking of data from the currency begin within the "green" portion of the bill, and not at the margin.

SUMMARY OF THE INVENTION

In light of the foregoing, it is a first object of the invention to provide a security validator which is capable of recognizing multiple denominations of currency.

Another object of the invention is to provide a security validator which is simplistic in design and operation, but which includes a positive sensing system wherein a note is held against the sensor to obtain good data resolution.

Yet an additional object of the invention is to provide a security validator in which the taking of data from the currency is synchronized from the border between the margin and the "green edge" of the currency.

Still another object of the invention is the provision of a security validator which takes data from both sides of the currency.

Yet an additional object of the invention is the provision of a security validator which includes means for providing audible communication with the user.

The foregoing and other objects of the invention which will become apparent as the detailed description proceeds are achieved by a security validator, comprising: a tray for receiving and transporting a piece of currency along a path to a testing station; and means for audibly identifying such piece of currency as to its validity and denomination.

Yet other objects of the invention are achieved by apparatus for determining the authenticity of a piece of currency, comprising: conveyor means for transporting the currency along a note path; sensor means positioned along said note path for obtaining data from the currency; means in juxtaposition to said sensors for urging the currency toward said sensors; and processing means connected to and receiving said data from said sensors.

DESCRIPTION OF DRAWINGS

For a complete understanding of the objects, techniques, and structure of the invention, reference should be had to the following detailed description and accompanying drawings wherein:

FIG. 1 is a perspective view of the security validator of the invention;

FIG. 2, comprising FIGS. 2A and 2B, presents a perspective view and a side orthogonal view of a spring biased element for urging the currency toward a sensor;

FIG. 3, comprising FIGS. 3A and 3B, presents an assembly illustration, and side orthogonal view of a spring-biased element for urging the currency toward the sensor;

FIG. 4, comprising FIGS. 4A–4D, illustrates yet another means for urging the currency toward the sensor by presenting a cross-sectional view of the housing (FIG. 4A), a top plan view of the housing (FIG. 4B), a front perspective view of the button (FIG. 4C), and an illustrative operational view of the structure (FIG. 4D);

FIG. 5, comprising FIGS. 5A and 5B, illustrates the disparity in margin width experienced between bills of the same denomination.

BEST MODE FOR CARRYING OUT THE INVENTION

Figure 6:
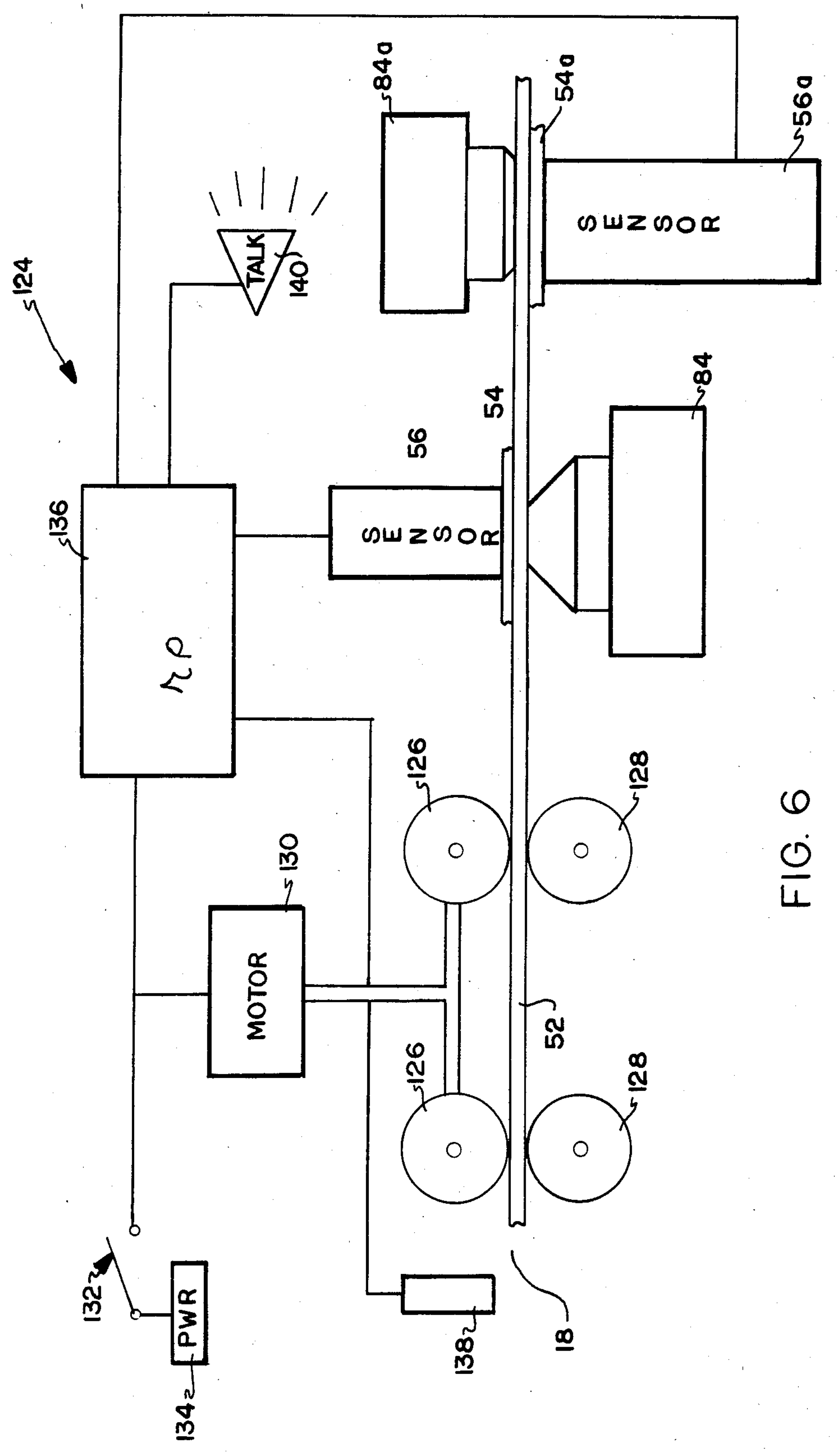
FIG. 6 is a functional schematic of the security validator of the invention.

Referring now to the drawings, and more particularly FIG. 1, it can be seen that a table top security validator is designated generally by the numeral 10. The validator is maintained within a casing 12 which has a recessed tray 14, partially enclosed by a cover 16, defining a note path or passageway 18 therebetween. The recessed tray 14 provides a convenient receptacle for receiving a piece of currency 20, which currency 20 is then passed along the note path 18 in a manner to be discussed later herein. Suffice it to say that it is during this passage that the tests for authenticity are conducted.

Also included with the table top validator 10 is a power switch 22 for activating or deactivating the testing system as will become apparent hereinafter. A volume control switch 24 is provided for regulating the volume of the audible tones emitted as a result of the testing function. Of course, screws 26 are provided to secure the casing 12 to a base portion, removal of the casing 12 exposing the operative mechanisms of the invention for servicing.

As discussed above, it is contemplated that the invention herein will utilize an LED reflectance sensor to take a plurality of readings along the note 20 as it traverses the note path 18. To assure a high resolution of the data obtained, it is most desired that the currency be brought into close proximity to the sensor. For that purpose, various devices for urging the currency toward the sensor are presented hereinafter.

With reference now to FIG. 2, it can be seen that a hold-down lever 28 is provided with a cross arm 30 having a hole 32 passing therethrough for receipt of a pin 34, which pin is fixed such that hold-down lever 28 may pivot thereabout. Extending normally from the cross arm 30 is a body member 36 having an arcuate bottom surface 38 depending therefrom. It will be appreciated that the entire hold-down lever 28 is preferably molded from an extremely smooth or slick plastic material such that the arcuate surface 38 is characterized by a low coefficient of friction.

A rear flange 40 extends from the body member 36 and is characterized by a slot 42 therein adapted for receiving a biasing screw 44, which screw is threadedly received by the boss 46. The screw 44 receives between the head thereof and the flange 40 a spring 48, maintained between the washers 50. The spring 48 is compressed by the threading of the screw 44. This compression urges the arcuate surface 38 downward due to the pivotal action about the pin 34. The hold-down lever 28 is positioned along the note path, across which the note 52 passes. It is also positioned in direct juxtaposition to a sensor 56 which communicates in data-receiving action with the note 52 through a window 54. It will be appreciated that the window 54 may be part and parcel of the sensor 56, or may be separate therefrom. In any event, the window 54 is transparent.

It will now be appreciated that the screw 44 is adjusted such that the spring 48 urges the arcuate surface 38 into such a position with the window 54 that the note 52 passes therebetween with but minimal clearance. With the surface 38 being arcuate and of low coefficient of friction, the note 52 is unimpeded as it passes the sensor 56, but is urged against the window 54 such that a high resolution data reading may be obtained. Again, it will be appreciated that the sensor 56 is typically of the LED reflectance type.

Another structure proposed for urging the currency toward the sensor is illustrated in FIG. 3 wherein a hold-down roller is designated by the numeral 58. It will be noted that the structure 58 includes a lever arm 60 having a hole 62 passing through a first end thereof. A wheel 64 is maintained at this end of the arm 60 by means of the shoulder screw 66 threaded into the hole 62. Provided at the other end of the lever arm 60 is a hole 68 adapted for receiving a pivot pin 70 therein, the pin being fixed. The pivot pin 70 passes through the arm 72 which extends from this second end of the lever arm 60. A torsion spring 74 is so configured that an arm 76 may be received under the arm 72, with the leg 78 extending across the top 80 of the lever arm 60. The leg 82 is then brought up to also rest against the top 80 of the lever arm 60 such that the torsion spring 74 urges the lever arm downward as best shown in FIG. 3B.

As illustrated in FIG. 3B, the spring 74 urges the wheel 64 at the end of the lever arm 60 into contacting engagement with the note 52, urging that note toward the window 54 of the sensor 56. Of course, the lever arm 60 pivots about the pivot pin 70 and the wheel 64, presenting very low frictional impediment, allows the note 52 to be transported thereunder in close juxtaposition to the sensor.

With reference now to FIG. 4, yet another structure for urging the currency toward the sensor may be seen. As illustratively shown in FIG. 4D, a hold-down button assembly is designated by the numeral 84. The assembly 84 includes a housing 86, preferably of plastic construction, which has screw cavities 88 provided therein. These screw cavities, of course, provide for securing engagement of the housing 86 to a point adjacent the note path. Also included in the housing 86 is a spring-receiving cavity 90 of cylindrical configuration. There is also provided a housed-out receptacle 92 and a bore 94 adapted for receiving the button assembly 96, shown in FIG. 4C. The button assembly includes a stem 98 which is received in the bore 94, a base 100, received by the receptacle 92, and against which the spring operates to urge the button into contacting engagement with the currency. A button head 102 extends from the base 100 and is characterized by chamferred edges 104. The chamferred edges 104, taken in combination with the button 96 being made of a slick, plastic material, substantially eliminates any likelihood that the button 96 might impede or catch a bill passing thereunder.

As shown in FIG. 4D, a spring 106, actually received in the cavity 90, urges the button assembly 96 toward the note 52, pressing it against the window 54 of the sensor 56. Again, with the button assembly 96 being of a plastic material of low friction coefficient, and with the edge 104 being chamferred, there is little or no likelihood that the assembly of FIG. 4 will operate otherwise than to urge the currency to the sensor.

One who carefully inspects various pieces of U.S. currency will observe that the green portion of the bill is surrounded by a white margin. He will also readily note that the size of the white margin, particularly on the ends of the bill, varies in width from bill to bill. As shown in FIG. 5A, the edge of the dollar bill 108 has a white margin 110 which precedes the leading edge 112 of the green portion 114. It is the green portion 114 which contains the data which the sensors obtain. Accordingly, it is important that data be taken with reference to the leading edge 112 of the green portion 114, rather than the edge of the bill itself. This is simply due to the fact that the white margin 118 of the dollar bill 116 is much narrower than that of the bill 114. Accordingly, the leading edge 120 of the green portion 122 of the note 116 differs from that of the note 114 when considered with respect to the edge of the note itself. Accordingly, if test data were to be taken from each of the notes 114,116, with respect to the edge of the note itself, the data from equally valid notes would differ greatly. However, if the data is taken with respect to the leading edges 112,120 of the green portions 114,122, the data should track quite well. Accordingly, it is contemplated that the sensors of the instant invention will, upon sensing the leading edge of the green portion of the bill, initiate the actual data-taking process.

With reference now to FIG. 6, the operational schematic of the validator of the invention is shown by the numeral 124. It will be seen that drive rollers 126 are adapted for engaging driven rollers 128 for passing the note 52 therebetween. Preferably, the rollers 126,128 are of a resilient nature, and, in some embodiments, it is possible that only the drive rollers be provided, with the note being passed along a smooth surface. In any event, a motor 130 is provided for controlling the drive wheels 126. A power switch 132, which may correlate with the power switch 22 of FIG. 1, is provided for applying power 134 to the circuitry of the invention. It is contemplated that the power source 134 may be either AC power, appropriately reduced and/or converted to DC levels by power supplies or the like, or the power source 134 may, indeed, be a battery-powered source.

A microprocessor 136 is provided to control the operation of the physical elements illustrated by the schematic 124 and to provide the arithmetic capability necessary for treating the data obtained from the sensors **56,56*a*. It will also be noted that an input sensor 138 is provided, which sensor, upon determining that a note has been presented thereunder, communicates the same to the microprocessor 136, which activates the motor 130 to begin the drive wheels 126. The note 52 is then conveyed along the note path and the testing stations. It will also be noted that the microprocessor 136** controls a voice box containing a recording or other audible sound such as a beep, which may be discerned by the user as an indicia of the validity and denomination of the currency.

In operation, the user places a paper offered as a valid currency in the tray 14 and slides it into the note path to the point where it is sensed by the sensor 138. The sensor 138 communicates to the microprocessor 136 that a paper is present, at which time the microprocessor 136 activates the motor 130 to drive the wheels 126. The paper or purported note 52 is then driven past the sensors **56,56*a* with the sensor 56 reading the top of the note on the note's way in, and the sensor 56*a* taking data from the bottom of the note as the note 52 is returned. It will, of course, be appreciated that the microprocessor 136 is programmed to sample data at various points or at fixed frequencies as the note 52 traverses its path. Upon sensing the end of the note, the microprocessor 136 causes the reversible motor 130 to reverse the drive of the wheels 126 and return the note 52. At this point in time, the sensor 56*a* takes data from the bottom of the note. The data so received is then compared to corresponding data taken from authentic currency, and the determination is then made as to whether the currency is valid and its denomination is identified. Obviously, the microprocessor 136 would contain data corresponding to the various bills to be tested, and would contain data corresponding to such bills in each of the four attitudes in which the bills may be presented into the tray 14. Upon obtaining an acceptable comparison with the stored data, the microprocessor 136 audibly identifies the bill via the voice box 140 in either an intelligible, recorded human voice, or by a beeping system. Of course, if the paper 52 does not satisfy any of the tests stored in the microprocessor 136**, an indication of that result is also audibly made.

Thus it can be seen that the objects of the invention have been satisfied by the structure presented hereinabove. While in accordance with the patent statutes only the best mode and preferred embodiment of the invention are presented and described in detail, it is to be understood that the invention is not limited thereto or thereby. Accordingly, for an appreciation of the true scope and breadth of the invention, reference should be had to the appended claims.

What is claimed is:

1. A table top security validator for determining the validity and denomination of paper currency, regardless of which of the four common orientations in which the bill is presented, said validator comprising:

(a) a casing having a tray for receiving and defining a path for a piece of currency;

(b) conveyor means for transporting the currency along said path;

(c) means for activating said conveyor means when a piece of currency is present;

(d) sensor means of the reflectance type positioned along the path for obtaining data from the currency, said sensor means including a pair of sensors, one each above and below said path;

(e) means in juxtaposition to each said sensor for urging the currency toward each said sensor such that a high resolution data reading may be obtained;

(f) processing means connected to and receiving said data from said sensor means;

(g) said processing means determining, from data received from said sensor means, where a margin on said currency terminates and a data-bearing portion begins, said processing means receiving and processing data only beyond said margin;

(h) said processing means containing data for determining the authenticity and denomination of a plurality of denominations of currency, irrespective of the four possible attitudes in which the currency is presented into said tray; and (i) means for audibly identifying such piece of currency as to its validity and denomination.

2. A security validator according to claim 1 in which said tray and said path are essentially horizontal.

3. A security validator according to claim 2 in which said conveyor means transports said currency first in one direction and then in the opposite direction and in which the first said sensor tests a top portion of said currency when said currency passes in one direction, and the second said sensor tests a bottom portion of said currency when said currency passes in the opposite direction.

* * * * *